United States Patent [19]

Dhyanchand et al.

[11] Patent Number: 4,973,902
[45] Date of Patent: Nov. 27, 1990

[54] FAULT DETECTOR FOR AIRCRAFT VARIABLE SPEED, CONSTANT FREQUENCY POWER SUPPLY

[75] Inventors: John Dhyanchand; Vietson Nguyen, both of Rockford, Ill.

[73] Assignee: Sundstrand Corporation, Rockford, Ill.

[21] Appl. No.: 448,251

[22] Filed: Dec. 11, 1989

[51] Int. Cl.$^5$ .............. G01R 31/02; H02H 7/06
[52] U.S. Cl. .............. 324/158 MG; 324/521; 340/648; 361/20
[58] Field of Search .............. 324/158 MG, 511, 521, 324/545; 361/20, 21; 322/20, 99; 340/648

[56] References Cited

U.S. PATENT DOCUMENTS

| | | | |
|---|---|---|---|
| 4,528,493 | 7/1985 | Spencer et al. | 324/158 MG |
| 4,710,840 | 12/1987 | Shepler et al. | 361/20 |
| 4,761,703 | 8/1988 | Kliman et al. | 324/545 |

*Primary Examiner*—Ernest F. Karlsen
*Attorney, Agent, or Firm*—Whitham & Marhoefer

[57] ABSTRACT

A variable speed, constant frequency aircraft power system uses current sensing diodes to rectify the power generator output. The current flow through pairs of diodes is compared to generate phase currents to detect feeder faults.

6 Claims, 2 Drawing Sheets

4,973,902

FAULT DETECTOR FOR AIRCRAFT VARIABLE SPEED, CONSTANT FREQUENCY POWER SUPPLY

BACKGROUND OF THE INVENTION

1. Field of the Invention

The present invention generally relates to variable speed, constant frequency aircraft power generating systems, and more particularly to an improved fault detection circuit for such systems.

2. Description of the Prior Art

In an aircraft power generating system employing a variable speed, constant frequency control, a three phase power generator is driven by the aircraft engine turbine. A power transmission line couples the generator output to a full wave rectifier whose DC output is coupled to an invertor. In order to detect a fault between the generator and the rectifier/inverter, fault detection systems have been proposed which use a current transformer in each leg of the generator to sense the input current to the power line and a second set of current transformers to sense the input current to the rectifier. The phase currents at each end of the power transmission line are compared and an unbalance current indicates a fault. While generally satisfactory in operation, such prior art fault detection circuits are relatively costly, and more importantly, the use of current transformers adds weight to the aircraft power generating system.

Power semiconductor devices having a main current section and a current sensing section that follows the current in the main section have recently been developed. Insulated gate bipolar transistors and diodes with such current sensing have been proposed to provide overcurrent threshold detection and as current controlled inverter switches for an AC polyphase motor drive; for example, U.S. Pat. No. 4,777,579. However, they have not been used for fault detection in variable speed, constant frequency aircraft power generating systems.

SUMMARY OF THE INVENTION

It is an object of this invention to provide an improved fault detection circuit for variable speed, constant frequency aircraft power generating systems; one which employs current sensing transistors.

Briefly, this invention contemplates the provision of a fault detector for an aircraft VSCF power generating system in which a full wave power rectifier coupled between the generator and the inverter is comprised of diodes with integral power sensing elements. The output of each element is converted to a voltage signal and pairs of diodes signals are summed and compared respectively with a voltage signal indicative of each generator phase current.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
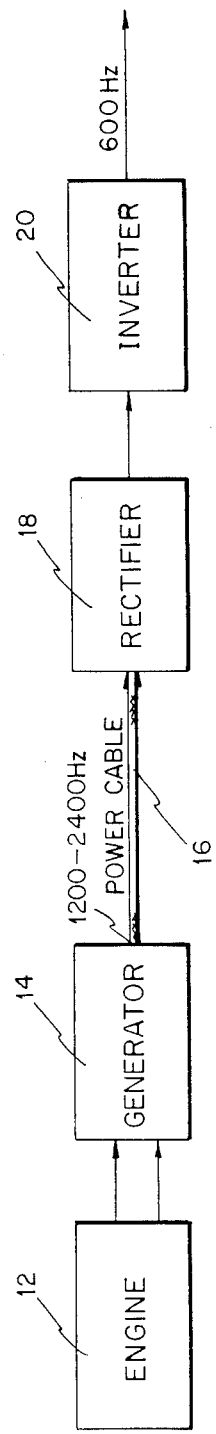
FIG. 1 is a block diagram of a typical aircraft power generating system employing variable speed, constant frequency control.

Referring now to FIG. 1, as will be appreciated by those skilled in the art, a variable speed, constant frequency power generating system typically includes a turbine engine mechanically coupled to and driving a three phase a.c. generator 14. The frequency of the generator output varies widely owing to variations in speed of the engine 12; for example from 400 to 1200 hertz. A power cable 16, which may be on the order of 100 feet long in a typical application, couples the output of the generator 14 to the input of a three phase full wave rectifier 18 whose d.c. output is coupled to the input of the inverter 20 which generates a constant frequency a.c. power output.

Figure 2:
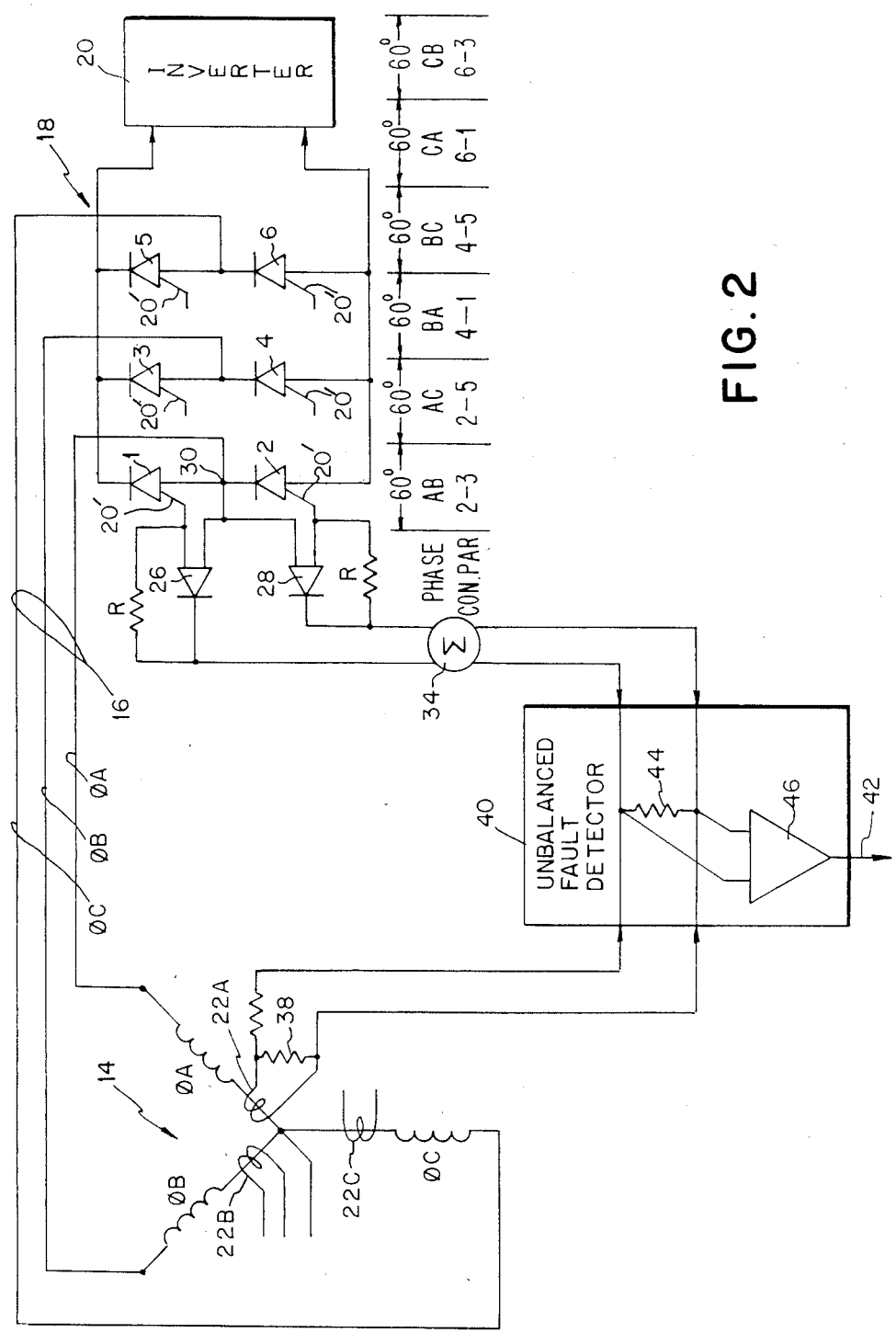
FIG. 2 is a schematic diagram of one embodiment of a fault detection for aircraft power systems in accordance with the teachings of this invention.

Referring now to FIG. 2, the three phase rectifier is comprised of current source power diodes labelled 1 through 6. Each of the diodes has an integral current sensing lead 20'. The current in the current following lead 20' will be $1/\eta$ times the main current where $\eta$ is typically on the order of 100.

Three phase power cable 16 couples each phase ($\phi/A$; $\phi/B$ and $\phi/C$) of the three phase generator 14 to rectifier 18. As will be recognized by those skilled in the art, the diodes 1 to 6 are interconnected to the power leads as a full wave, three phase rectifier providing a d.c. output to inverter 20. The chart shows the diodes pairs which conduct in 60 electrical degrees increments.

Suitable generator phase current detectors, such as current transformers 22A; 22B and 22C, respectively, sense the phase current $\phi/A$; $\phi/B$ and $\phi/C$ at the generator. The process for detecting $\phi/A$ feeder faults is shown and will be described herein in detail. It ill be appreciated that feeder fault detection for $\phi/B$ and $\phi/C$ can be carried out in the same manner and therefore is not repeated in detail here.

In a no-fault situation, the sum of currents flowing through diodes 1 and 2 will be equal to the current flowing in the generator winding and power lead for phase A. The current sensing leads 20 of diodes 1 and 2 are coupled respectively as one input to operational amplifiers 26 and 28 whose other inputs are coupled to a common reference junction 30. Amplifiers 26 and 28 respectively convert the current flow signal through diodes 1 and 2 to a voltage signal ($v_1$; $v_2$) equal to $i_{01} \times R/_n$, where R is the value of the feedback resistor and n is the ratio of the main current in the diodes 1 and 2 to current sensing current. A summing junction 34 sums the outputs of amplifiers 26 and 28 to produce a sinusoidal output voltage which is a function of the current flow in $\phi/A$ under no-fault conditions.

A burden resistor 38 converts the output of current transformer 22A to a voltage signal proportional to the total $\phi/A$ current divided by the current transformer ratio N. By a proper selection of parameters, it will be appreciated that the output signal of current transformer 22A will be instantaneously equal to the output of summing junction 34 under no-fault conditions. A comparator 40 compares these two instantaneous signals and provides an output fault signal on lead 42 if there is an instantaneous imbalance in the inputs. The unbalance fault detector 40 is illustrated here as comprised of a resistor 44 and a comparator 46, which detects any current flow through the resistor as would result from an unbalance condition, although any suitable detector may be used.

While the invention has been described in terms of a single preferred embodiment, those skilled in the art will recognize that the invention can be practiced with modification within the spirit and scope of the appended claims.

Having thus described our invention, what we claim as new and desired to secure by Letters Patent is as follows:

1. A fault detector for a variable speed, constant frequency aircraft power system, comprising in combination;
   a three phase power generator;
   means for generating a signal which is a function of the current flow in one phase of said generator;
   a three phase rectifier;
   power leads coupling said generator to said rectifier;
   said rectifier including at least one pair of diodes, each with an integral current sensor;
   means for combining an output of said current sensor of each of said pair of diodes to generate a signal which is a function of said phase current at said rectifier, and
   means for comparing said generator phase current signal and said rectifier phase current signal.

2. A fault detector for a variable speed, constant frequency aircraft power system as in claim 1 wherein said means for generating a signal which is a function of the current flow in one phase of said generator is a current transformer.

3. A fault detector for a variable speed, constant frequency aircraft power system as in claim 1 wherein said combining means includes a pair of operational amplifiers.

4. A fault detector for a variable speed, constant frequency aircraft power system as in claim 1 wherein said generator phase current signal and said rectifier phase current signals are voltage signals.

5. A fault detector for a variable speed, constant frequency aircraft power system as in claim 2 wherein said generator phase current signal and said rectifier phase current signals are voltage signals.

6. A fault detector for a variable speed, constant frequency aircraft power system as in claim 3 wherein said generator phase current signal and said rectifier phase current signals are voltage signals.

* * * * *